United States Patent [19]

Yokouchi et al.

[11] Patent Number: 5,271,631
[45] Date of Patent: Dec. 21, 1993

[54] MAGNETIC FLUID SEAL APPARATUS

[75] Inventors: Atsushi Yokouchi, Kanagawa; Shigeki Matsunaga, Tokyo, both of Japan

[73] Assignee: Nippon Seiko K.K., Tokyo, Japan

[21] Appl. No.: 22,872

[22] Filed: Feb. 25, 1993

Related U.S. Application Data

[63] Continuation of Ser. No. 798,844, Nov. 25, 1991, abandoned, which is a continuation of Ser. No. 527,909, May 24, 1990, abandoned.

[30] Foreign Application Priority Data

May 31, 1989 [JP] Japan .................. 1-136179
Apr. 23, 1990 [JP] Japan .................. 2-105236

[51] Int. Cl.⁵ .................................. F16J 15/32
[52] U.S. Cl. .................................. 277/80; 277/227; 277/DIG. 6
[58] Field of Search ............... 277/80, 227, 235 A; 427/314

[56] References Cited

U.S. PATENT DOCUMENTS

| | | | |
|---|---|---|---|
| 3,818,074 | 6/1974 | Albrecht | 277/DIG. 6 |
| 4,462,332 | 7/1984 | Nath et al. | 277/80 |
| 4,486,026 | 12/1984 | Furumura et al. | 277/80 |
| 4,628,384 | 12/1986 | Raj et al. | |
| 4,692,826 | 9/1987 | Raj et al. | |
| 4,786,658 | 11/1988 | Hashimoto et al. | 350/96.29 |
| 5,215,313 | 6/1993 | Yokouchi et al. | 277/80 |

FOREIGN PATENT DOCUMENTS

| | | |
|---|---|---|
| 51-11084 | 1/1976 | Japan . |
| 51-23489 | 2/1976 | Japan . |
| 58-27426 | 6/1983 | Japan . |
| 58-191423 | 12/1983 | Japan . |
| 0049169 | 3/1985 | Japan .................. 277/80 |
| 60-48668 | 10/1985 | Japan . |
| 61-13025 | 1/1986 | Japan . |
| 61-44067 | 3/1986 | Japan . |
| 61-79070 | 5/1986 | Japan . |
| 62-110080 | 5/1987 | Japan . |
| 62-195261 | 12/1987 | Japan . |
| 62-204027 | 12/1987 | Japan . |
| 63-8419 | 1/1988 | Japan . |
| 63-29944 | 8/1988 | Japan . |
| 63-139325 | 9/1988 | Japan . |
| 2-89878 | 3/1990 | Japan . |

OTHER PUBLICATIONS

"Fluorine-Containing Surfactants Active Agent", vol. '79-7, pp. 11-22, date unknown.
U.S. Trademark Disclosure No. 842,293, registered Jan. 16, 1968.

Primary Examiner—William A. Cuchlinski, Jr.
Assistant Examiner—Daniel G. DePumpo
Attorney, Agent, or Firm—Sughrue, Mion, Zinn, Macpeak & Seas

[57] ABSTRACT

A magnetic fluid seal is improved by coating parts of the sealing mechanism and/or adjacent surfaces with a fluorine-containing surfactant as an oil-repelling layer. The surfactant is effective to prevent the spread of the oil-based magnetic fluid into interior mechanisms of the sealed apparatus, which may typically require a high degree of cleanliness.

60 Claims, 4 Drawing Sheets

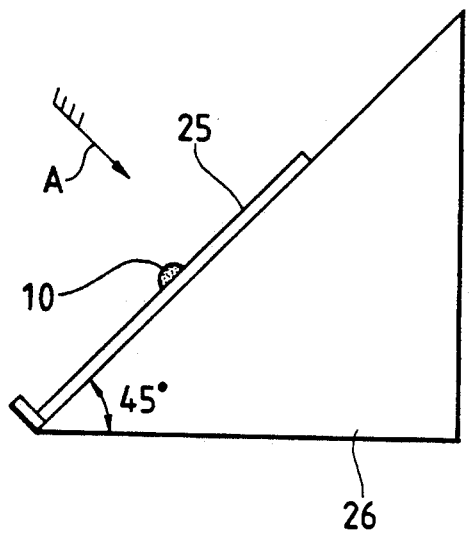
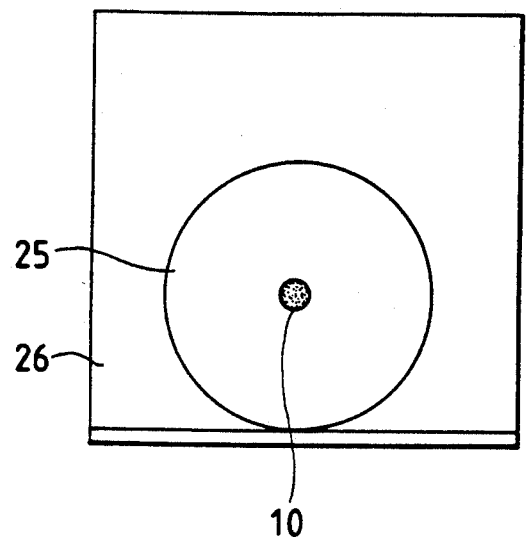
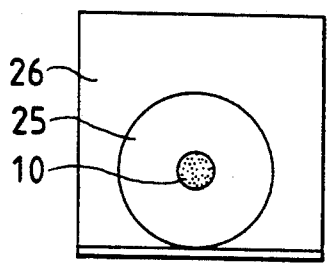
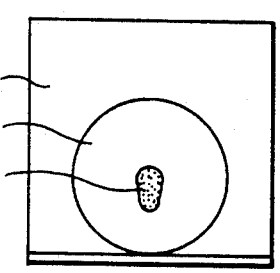
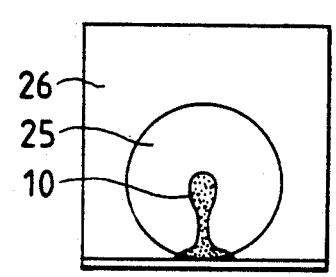
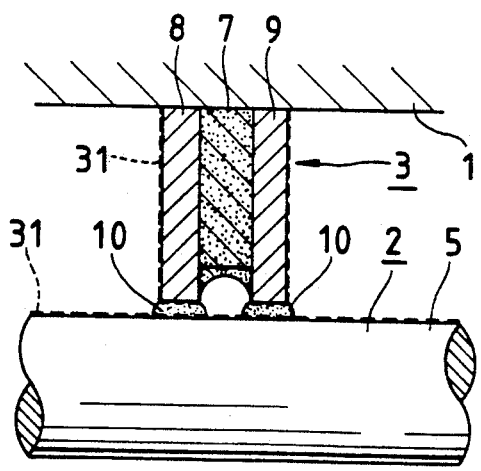
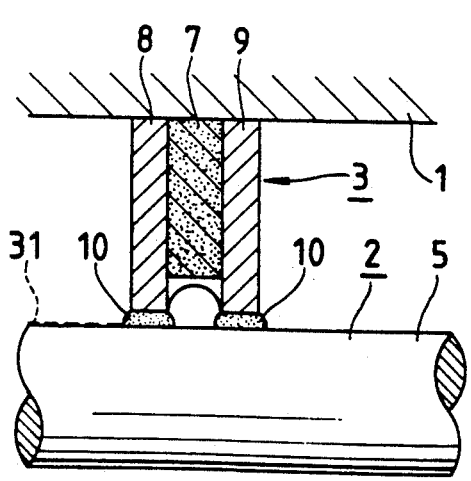

MAGNETIC FLUID SEAL APPARATUS

This is a continuation of application Ser. No. 07/798,884 filed Nov. 25, 1991 now abandoned which was a continuation of application Ser. No. 07/527,909 filed May 24, 1990 now abandoned.

BACKGROUND OF THE INVENTION

The present invention relates to a magnetic fluid seal apparatus, and particularly to a magnetic fluid seal adapted to insure that the area where the driving shaft of a hard disc drive passes through the wall of the casing is kept airtight.

The hard disc in a computer is a magnetic recording element contained within a casing and driven to rotate by means of a motor provided outside the casing. A hard disc should never be fouled by dust or other contamination, so the area where the drive shaft of the motor penetrates the wall of the casing must be provided with a seal apparatus that prevents the passage of dust. To this end, magnetic fluid seal apparatuses are commonly employed as described in many prior patent documents such as JP-A-62-110080 (the term "JP-A" as used herein indicates an unexamined published Japanese patent application), JP-A-U-58-191423 (the term "JP-A-U" as used herein indicates an unexamined published Japanese utility model application), JP-A-U-61-13025, JP-A-U-61-44067, JP-A-U-61-79070, JP-A-U-62-195261, JP-A-U-61-204027, JP-A-U-63-8419, JP-A-U-63-139325, JP-B-U-63-29944 (the term "JP-B-U" as used herein indicates an examined Japanese utility model publication) as well as U.S. Pat. No. 4,628,384 and 4,692,826.

While the details of the magnetic fluid seal apparatuses described in these prior publications differ in various ways, basically, they have the construction shown in FIG. 15. At 1 in FIG. 15 is a housing made of a nonmagnetic material such as aluminum or a synthetic resin which is typically secured to the wall of the casing of the hard disc. At 2 is a shaft made of a magnetic material such as iron. The magnetic fluid seal apparatus generally indicated at 3 is positioned in the cylindrical space 6 between the inner surface 4 of the housing 1 and the outer surface 5 of the shaft 2.

The magnetic fluid seal apparatus 3 comprises an annular permanent magnet 7 that is magnetized in the axial direction (in the horizontal direction as viewed in FIG. 15) and which is sandwiched between a pair of annular pole pieces 8 and 9 made of a magnetic material, with a magnetic fluid 10 being retained in the gap 11 between the inner edge of each pole piece and the outer surface 5 of the shaft 2 by the magnetism of the permanent magnet 7. The outside diameter of the permanent magnet 7 and each of the pole pieces 8 and 9 is set to be equal to or slightly greater than the inside diameter of the housing 1, so that the magnetic fluid seal apparatus 3 composed of the members 7, 8, 9 and 10 is fitted in the housing 1 and secured to its inner surface.

By this arrangement, the magnetic fluid seal apparatus 3 is positioned between the inner surface 4 of the housing 1 and the outer surface 5 of the shaft 2, so irrespective of the rotation of the shaft 2 within the housing 1, the magnetic fluid 10 held between the outer surface 5 of the shaft 2 and the inner edge of each of the pole pieces 8 and 9 insures a complete seal between the inner surface 4 of the housing 1 and the outer surface 5 of the shaft 2. It should be noted here that the use of two pole pieces 8 and 9 is not a mandatory requirement and only one pole piece suffices for the magnetic fluid seal apparatus as long as a bearing assembly or some other means positioned in the vicinity of the magnetic fluid seal apparatus 3 aids in forming a magnetic field.

If the magnetic fluid 10 spreads over the surface of the shaft 2 (or, in other configurations, over the lateral sides of pole pieces 8 and 9 or the inner surface of the housing 1), the chance of its splashing into the clean area where the hard disc is accommodated will increase. If the magnetic fluid 10 is deposited on the surface of the hard disc, the computer using this hard disc can operate erroneously. With a view to solving this problem, JP-B-60-48668 proposes that oil-repelling films 12 typically made of polytetrafluoroethylene (PTFE) be formed in the neighborhood of the gaps 11 where the magnetic fluid 10 is retained as shown in FIG. 16, thereby preventing it from splashing into the clean area through the gaps 11. The similar proposal of the above-mentioned proposal is also shown in the JP-B-58-27426. In order to produce a high-performance, durable and reliable magnetic fluid seal apparatus at low cost, it is necessary that a film which is as thin as possible, that is tenacious and that has a strong oil repelling ability be easily and efficiently formed. However, none of these conditions are fully satisfied by the technique described in JP-B-60-48668. First, not only is it costly to form films 12 from an oil-repelling material such as PTFE, but also the films so formed become so thick that the dimensions of the gaps 11 are apt to change and may fail to retain a sealing amount of the magnetic fluid 10. Second, if the PTFE films 12 separate from the surface on which they were formed, comparatively large dust particles will become suspended in the space where the hard disc is accommodated and this can be another cause of erroneous operation of the computer using said hard disc.

SUMMARY OF THE INVENTION

An object, therefore, of the present invention is to provide a magnetic fluid seal apparatus that is free from all of the aforementioned defects of the prior art.

BRIEF DESCRIPTION OF THE DRAWINGS

FIG. 3 is a side view of a sliding table used in an experiment conducted to verify the effectiveness of the present invention;

FIG. 4 shows the same table as viewed in the direction indicated by arrow A in FIG. 3;

FIGS. 5-7 show how the magnetic fluid tested in the experiment behaved, with each drawing representing the sliding table as viewed in the direction indicated by arrow A in FIG. 3;

FIGS. 8-14 show examples of the area in which an oil-repelling film is formed in accordance with the present invention;

DETAILED DESCRIPTION OF THE INVENTION

Figure 1:
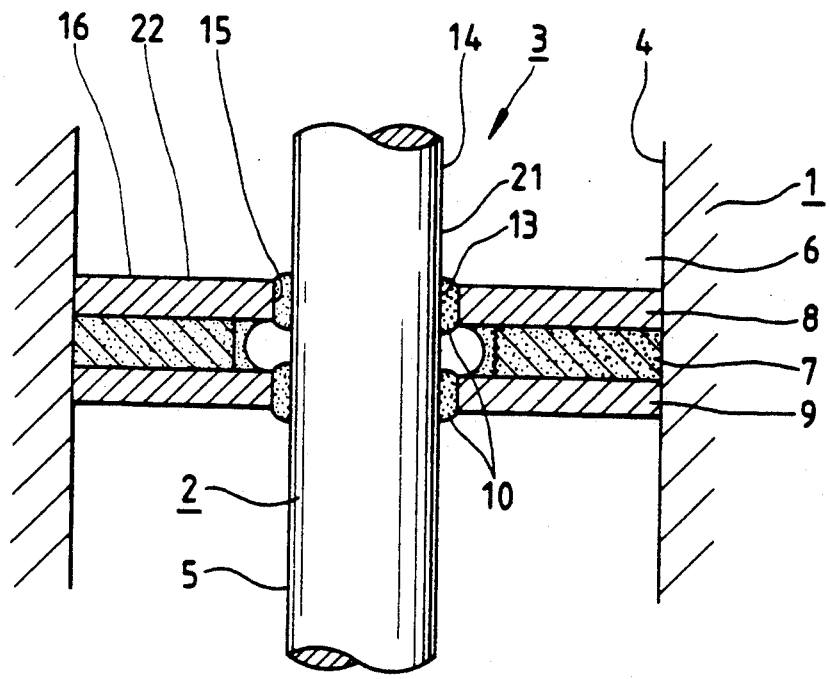
FIG. 1 is a cross-sectional view showing the basic configuration of the magnetic fluid seal apparatus of the present invention.
Figure 2:
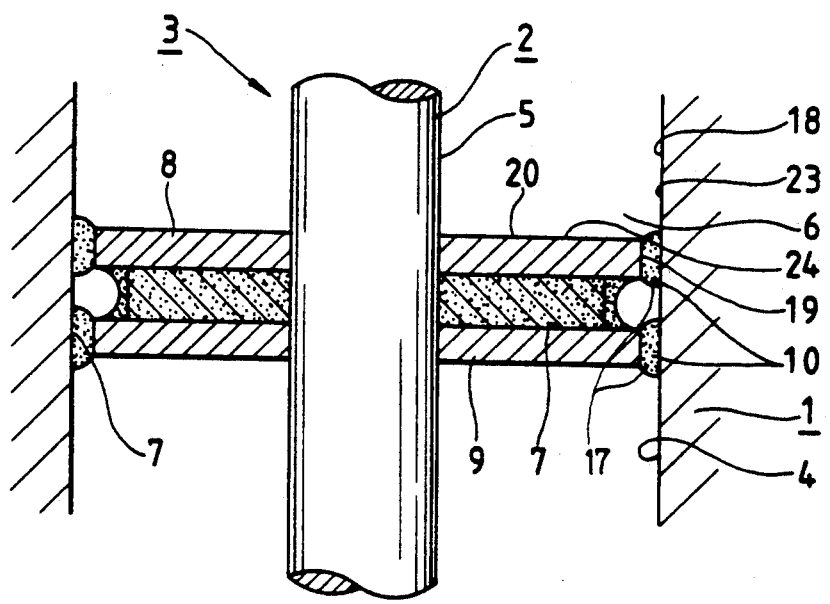
FIG. 2 is a cross-sectional view showing another basic configuration of the magnetic fluid seal apparatus of the present invention.

The magnetic fluid seal apparatus of the present invention may be constructed as shown in either FIG. 1 or FIG. 2. It comprises: a shaft 2 having a cylindrical outer surface 5 (the cross section of the shaft 2 need not necessarily be circular in the case of the construction shown in FIG. 2); a housing 1 that has a cylindrical inner surface 4 concentric with the outer surface 5 of the shaft 2 (the inner surface 4 need not be concentric with the shaft 2 in the case of the construction shown in FIG. 1), with the shaft rotating relative to said housing; a permanent magnet 7 formed in an annular shape of a size that permits it to be freely inserted into the cylindrical space 6 between the inner surface 4 of the housing 1 and the outer surface 5 of the shaft 2, said permanent magnet being magnetized in the axial direction; at least one pole piece 8 or 9 formed in an annular shape having a greater inside diameter than the outside diameter of the shaft 2 (FIG. 1), and secured to one lateral side of the permanent magnet 7. In FIG. 1, the pole piece(s) are fitted in the housing 1 and secured to its inner surface 4. In the cases shown in FIGS. 1 and 2, two pole pieces 8 and 9 are used and the permanent magnet 7 is sandwiched therebetween, and particularly in the case of the construction shown in FIG. 2, neither the permanent magnet 7 nor the pole pieces 8 and 9 need necessarily be in annular form as long as the pole pieces have a circular circumference. A magnetic fluid 10 of the type known in the prior art is retained either between the inner edge of each pole piece and the outer surface of the shaft 2 (as in FIG. 1) or between the outer edge of each pole piece and the inner surface 4 of the housing 1 (as in FIG. 2) under the influence of the magnetism of the permanent magnet 7. At least the area of the inner surface 4 of the housing 1 or the outer surface 5 of the shaft 2 on which the magnetic fluid 10 is to be deposited is made of a ferromagnetic material.

In the construction shown in FIG. 1 in which the permanent magnet 7 and each of the pole pieces 8 and 9 are secured to the inner surface of the housing 1, the area of the outer surface 5 of the shaft 2 on which the magnetic fluid 10 is deposited is designated the first deposit surface 13, the area of the outer surface 5 of the shaft 2 which extends more into the clean space (located in the upper part of FIG. 1) than the first deposit surface 13 is designated the first clean surface 14, the surface of the inner edge of the pole piece 8 is designated the second deposit surface 15, and part of one lateral side of the pole piece 8 which faces said clean space is designated the second clean surface 16.

In the construction shown in FIG. 2 in which the permanent magnet 7 and each of the pole pieces 8 and 9 are secured to the outer surface 5 of the shaft 2, the area of the inner surface 4 of the housing 1 on which the magnetic fluid 10 is deposited is designated the third deposit surface 17, the area of the inner surface 4 of the housing 1 which extends more into the clean space than said third deposit surface 17 is designated the third clean surface 18, the surface of the outer edge of the pole piece 8 is designated the fourth deposit surface 19, and the part of one lateral side of the pole piece 8 which faces said clean space is designated the fourth clean surface 20.

Each of the first to fourth deposit surfaces 13, 15, 17 and 19 is an area in which the magnetic fluid 10 is deposited to close the gap between the inner surface 4 of the housing 1 and the outer surface 5 of the shaft 2. On the other hand, each of the first to fourth clean surfaces 14, 16, 18 and 20 faces the clean space accommodating the hard disk and should be protected against the deposition of magnetic fluid 10.

The arrangement described above is the same as that of the known magnetic fluid seal apparatuses. What is characteristic about the magnetic fluid seal apparatus of the present invention is that a unique oil-repelling layer is formed between each of the deposit surfaces 13, 15, 17 and 19 and the associated clean surface 14, 16, 18 or 20 to insure that the magnetic fluid 10 present at those deposit surfaces will not reach any of the clean surfaces 14, 16, 18 and 20.

Thus, in accordance with the invention, either the first intermediate area 21 of the outer surface of the shaft 2 which is located between the first deposit surface 13 and the first clean surface 14 or the second intermediate area 22 on the lateral side of the pole piece 8 or 9 which is located between the second deposit surface 15 and the second clean surface 16, or both the first and second intermediate areas 21 and 22, have a fluorine containing surfactant adsorbed thereon to form an oil-repelling layer.

Further, in accordance with the invention, either the third intermediate area 23 of the inner surface 4 of the housing 1 which is located between the third deposit surface 17 and the third clean surface 18 or the fourth intermediate area 24 on the lateral side of the pole piece 8 or 9 which is located between the fourth deposit surface 19 and the fourth clean surface 20, or both the third and fourth intermediate areas 23 and 24, have a fluorine-containing surfactant adsorbed thereon to form an oil-repelling layer.

In each of the embodiments outlined above, it is preferred for the purpose of preventing the spread of magnetic fluid 10 to form an oil-repelling layer at both intermediate areas (namely, the first and second intermediate areas 21 and 22 in FIG. 1, and the third and fourth intermediate areas 23 and 24 in FIG. 2. It should, however, be noted that there is no particular need to form an oil-repelling layer in the areas where the spread of magnetic fluid 10 can effectively be prevented by centrifugal force. Further, an oil-repelling layer may also be formed on the respective deposit surfaces 13, 15, 17 and 19 or on the associated clean surfaces 14, 16, 18 and 20.

By the arrangement described above, the magnetic fluid seal apparatus of the present invention insures that every gap existing between the inner surface 4 of the housing 1 and the outer surface 5 of the shaft 2 is closed while the shaft is rotating relative to the housing, and this mechanism is essentially the same as that attained with the known magnetic fluid seal apparatuses.

In accordance with the present invention, the oil-repelling layer formed on at least one of the four intermediate areas 21-24 effectively insures that the magnetic fluid 10 retained at the edge portion of the pole piece 8 will not spread into the clean space; this action of the oil-repelling layer per se is essentially the same as that achieved by the invention described in JP-B-60-48668. However, in the magnetic fluid seal apparatus of the present invention the oil-repelling layer is formed of a fluorine-containing surfactant and this facilitates the formation of an extremely thin and very tenacious oil repelling layer. The layer is so thin that it has no substantial effect on the size of the gap in which the magnetic fluid will reside. This contributes to the manufacture of an inexpensive magnetic fluid seal apparatus that has high performance, durability and reliability. In order to form an oil-repelling layer from the fluorine-containing surfactant, the part to be provided with the oil-repelling layer is wetted (e.g., by immersion or spraying) with a solution of said fluorine-containing surfactant in a volatile solvent. This offers the advantage that a rugged oil-repelling layer can be formed on the surface of the part in an easy and rapid way without requiring baking or any other complicated procedure.

The molecules of the fluorine-containing surfactant of which the oil-repelling layer is formed are arranged in such a way that only those which are situated closest to the surface of the metal part are adsorbed either physically or chemically on the metal surface by means of terminal polar groups. This contributes to the formation of a monolayer which is very thin and which ye adheres strongly to the surface of the metal part.

When the part is immersed in the solution of the fluorine-containing surfactant, the latter is deposited in an amount greater than that necessary to form an adherent monolayer but the excess portion of the oil-repelling layer can be readily removed by immersing the part in a volatile solvent. Thus, there will be no excess surfactant to come off the surface of the metal part after it is assembled in the magnetic fluid seal apparatus.

The volatile solvent in which the fluorine-containing surfactant is to be dissolved may be selected from the group consisting of the following members: (1) alcohols such as methanol, ethanol, isopropanol, n-propanol and pentafluoropropanol (e.g., the Pefol TM series made by Daikin Kogyo Co., Ltd.); (2) fluorine-containing solvents such as trichlorotrifluoroethane ("Freon"), perfluoro- or fluoro-alkyl solvents; (3) ketone solvents such as acetone, methyl ethyl ketone and methyl isobutyl ketone; (4) cellosolve solvents such as methyl cellosolve, ethyl cellosolve and butyl cellosolve; (5) aldehyde solvents; (6) ester solvents such as ethyl acetate; (7) mixtures of 1,1,1-trichloroethane with (1), (3), (4), (5) or (6) (for example, a mixture of 1,1,1-trichloroethane with 0.1-30% of a combination of ethanol and n-propanol); and (8) mixtures of chlorine-containing organic solvents such as dichloro-hydrocarbons or trichloro-hydrocarbons with alcohols that boil at temperatures not higher than 150 ° C. (e.g., methanol, ethanol and isopropanol). The term "fluorine-containing solvent" as used hereinabove means solvents having at least one hydrogen atom ,in the molecular structure replaced by a fluorine atom, as exemplified by Freon based solvents, perfluoroalkyls and fluoroalkanols.

The solvents in groups (1) and (3) to (6) are highly flammable and are difficult to handle. On the other hand, the solvents in group (2) such as trichlorotrifluoroethane ("Freon") can deplete the earth's ozone layer. In addition, the solvents in group (2) such as perfluoro-alkyl solvents are expensive, so that the solvents are not suitable for practical use. Under these circumstances, the solvents of groups (7) and (8) are preferably used. It is more preferable to use admixtures of chlorine-containing organic solvents with alcohols that boil at temperatures not higher than 150° C. (e.g., methanol, ethanol and isopropanol). Chlorine-containing organic solvents are capable of dissolving up to about 0.01% of the fluorine-containing surfactant whereas alcohols that boil at temperatures not higher than 150° C. are capable of dissolving up to 60% of the same surfactant. On the other hand, chlorine-containing organic solvents are non-flammable and hence are safe to handle but alcohols that boil at temperatures not higher than 150° C. are highly flammable although they have the advantage of being quick to dry. Under these circumstances, the present inventors believe that the disadvantages of these two kinds of solvents can be eliminated while retaining their advantages by using them in combination. Chlorine-containing organic solvents are capable of dissolving up to 20% of alcohols that boil at temperatures not higher than 150° C. and the resulting mixture is comparatively non-flammable. Accordingly, up to 20% of the fluorine-containing surfactant can be dissolved in the mixture of a chlorine-containing organic solvent and an alcohol that boils at the temperature of 150° C. or below. In practical applications, the fluorine-containing surfactant can be dissolved in the mixture in amounts ranging from 0.01 to 20%, with the range of 0.1-5% being preferred.

When the fluorine-containing surfactant is to be dissolved in a group (8) solvent, the surfactant is preferably selected from among perfluoroalkyl betaines (amphoteric fluorine compounds with molecular weights of 100-2,000, as exemplified by "Futergent 400"), and the chlorine-containing organic solvent which is one component of solvent system (8) is preferably selected from among trichlorohydrocarbons which are highly flammable and very quick to dry.

Even if a portion of the fluorine-containing surfactant is released from the adherent monolayer that serves as the oil-repelling layer, only very small pieces of the surfactant (no larger than one molecule) will be suspended in the clean space. Since the size of these suspended pieces is much smaller than that required by cleanliness value "10" (no more than 10 particles with a size of 0.5 μm or more present in a volume of one cubic inch), which should be satisfied by the clean space, the suspended particles will by no means cause erroneous operation of the hard disc.

Experiments were conducted in order to verify the effectiveness of the present invention, using circular stainless steel plates (see FIGS. 3 and 4) made of the same material as the pole piece 8. An oil-repelling layer was formed on each of these stainless steel plates and a magnetic fluid 10 made of the same materials as used in the actual magnetic fluid seal apparatus was dropped on the surface of each stainless steel plate to see how it would behave on the plate surface.

Except in Experiment 7 (comparative example), all of the stainless steel plates 25 were surface-treated to form an oil-repelling layer using the following four steps (a)-(d).

(a) First step:

A degreased stainless steel plate 25 was immersed in a solution of 0.5 wt/v% of a coating agent (in the case of the present invention, a fluorine-containing surfactant) in a volatile solvent selected from the above-mentioned groups (1)-(7) for 20 seconds and thereafter removed from the solution. In Experiments 1-4 in which the fluorine-containing surfactant was of a perfluoropolyether type, Freon was used as a solvent.

(b) Second step:

The stainless steel plate 25 removed from the solution was dried.

(c) Third step:

The dried stainless steel plate 25 was immersed in a volatile solvent selected from the above-mentioned groups (1)-(7) for 20 seconds and thereafter removed from the volatile solvent to remove excess coating agent deposited on the surface of the steel plate.

(d) Fourth step:

The stainless steel plate 25 was dried.

After the completion of the surface treatment described magnetic fluid 10 was dropped onto the center of above, 1 μl of magnetic fluid 10 was dropped onto the center of the plate surface. Immediately thereafter, the steel plate was placed on a sliding table indicated at 26 in FIGS. 3 and 4. Five minutes later, the change in the shape of the magnetic fluid 10 was visually checked. The top face of the table 26 sloped at a gradient of 45 degrees, so that the magnetic fluid 10 dropped on the center of the plate surface would flow down the steel plate 25 by gravity.

The results of a visual check of the change in the shape of the magnetic fluid 10 that occurred after standing for 5 minutes were evaluated by the following criteria: "excellent" when no change occurred as shown in FIG. 5; "good" when the magnetic fluid 10 deformed but did not flow down to the lower edge of the stainless steel plate 25 as shown in FIG. 6; and "poor" when the magnetic fluid 10 deformed so extensively that it flowed down to the lower edge of the stainless steel plate 25 as shown in FIG. 7.

The purpose of the present invention is to attain a result that is at least comparable to "good", and preferably "excellent".

Experiment 1

An experiment was conducted under the conditions described above, with "FOMBLIN ZDIAC 2000" (a trade name of Nippon Montedison Co., Ltd.) being used as a perfluoropolyether dicarboxylic acid, a fluorine-containing surfactant. The magnetic fluid 10 dropped onto the surface of the stainless steel plate 25 did not deform at all as shown in FIG. 5 even after the passage of 5 minutes. It was therefore verified that the stainless steel plate 25 had an "excellent" oil-repelling property.

Experiment 2

An experiment was conducted under the conditions described above, with "FOMBLIN ZDIAC 4000" (a trade name of Nippon Montedison Co., Ltd.) being used as perfluoropolyether dicarboxylic acid, a fluorine-containing surfactant. The magnetic fluid 10 dropped onto the center of the surface of the stainless steel plate 25 did not deform at all as shown in FIG. 5 even after the passage of 5 minutes. It was therefore verified that the stainless steel plate 25 had an "excellent" oil-repelling property.

Experiment 3

An experiment was conducted under the conditions described above, with "GALDEN MONO ACID" (a trade name of Nippon Montedison Co., Ltd.) being used as a perfluoropolyether monocarboxylic acid, a fluorine-containing surfactant. The magnetic fluid 10 dropped onto the center of the surface of the stainless steel plate 25 did not deform at all as shown in FIG. 5 even after the passage of 5 minutes. It was therefore verified that the stainless steel plate 25 had an "excellent" oil-repelling property.

Experiment 4

An experiment was conducted under the conditions described above, with "Krytox 157 F/M" ( a trade name of E.I. Du Pont de Nemours & Co., Inc.) being used as a perfluoropolyether monocarboxylic acid, a kind of fluorine-containing surfactant. The magnetic fluid 10 dropped onto the center of the surface of the stainless steel plate 25 did not deform at all as shown in FIG. 5 even after the passage of 5 minutes. It was therefore verified that the stainless steel plate 25 had an "excellent" oil-repelling property.

The perfluoropolyether carboxylic acids used in the first to fourth experiments are fluorine compounds with molecular weights of 500–20,000 that have hydrophobic groups containing ether bonds in the fluorocarbon chain. Having comparatively high molecular weights, these fluorine compounds are believed to achieve their good oil-repelling properties by forming a molecular layer of comparatively long perfluoropolyether chains on the surfaces of metal parts. In the absence of hydrophobic groups that contain ether bonds in the fluorocarbon chain, the solubility of such high-molecular weight compounds in solvents becomes so low that a sufficiently adherent monolayer cannot be formed to exhibit good oil-repelling properties on the surfaces of metal parts. Therefore, ether bonds are indispensable when high-molecular weight fluorine-containing compounds are used as surfactants.

However, it is also possible to use a fluorine compound with a molecular weight of 500–20,000 having a hydrophobic group containing an ester bond in the fluorocarbon chain, as a fluorine-containing surfactant of the present invention.

Experiment 5

An experiment was conducted under the conditions described above, with "Futergent 400S" (a trade name of Neos Co. for a betaine surfactant) being used as a perfluoroalkyl amphoteric surfactant, a fluorine-containing surfactant. The magnetic fluid 10 dropped onto the center of the surface of the stainless steel plate 25 did to deform at all as shown in FIG. 5 even after the passage of 5 minutes. It was therefore verified that the stainless steel plate 25 had an "excellent" oil-repelling property.

Experiment 6

An experiment was conducted under the conditions described above, with "Surflon S-131" (a trade name of Asahi Glass Co., Ltd. for a betaine surfactant) being used as a perfluoroalkyl amphoteric surfactant, a fluorine-containing surfactant. The magnetic fluid 10 dropped onto the center of the surface of the stainless steel plate 25 did not deform at all as shown in FIG. 5 even after the passage of 5 minutes. It was therefore verified that the stainless steel plate 25 had an "excellent" oil-repelling property.

The perfluoroalkyl amphoteric surfactants used in Experiments 5 and 6 are fluorine compounds with molecular weights of 100–2,000 that are amphoteric, i.e., having both positive and negative charges in polar groups. Although these fluorine compounds have comparatively low molecular weights, the amphoteric groups allow the fluorine chains to be oriented in opposite directions when they are adsorbed on the stainless steel plate 25, thereby forming a monolayer of such fluorine chains deposited on the surface of a metal part at a comparatively high density to exhibit good oil-repelling properties. Ether bonds are not necessary for such perfluoroalkyl surfactants since they themselves are reasonably soluble in solvents.

However, it is also possible to use a perfluoroalkyl amino acid, as perfluoroalkyl amphoteric surfactants which are fluorine compounds with molecular weights of 100–2,000 that are amphoteric, i.e., having both positive and negative charges in polar groups.

An "excellent" oil-repelling property was achieved in each of Experiments 1–6. To further verify the effectiveness of the present invention, eight additional experiments were conducted. Experiment 7 was a comparison example in which only a "poor" oil-repelling property was exhibited. In Experiments 8–14, which were within the scope of the present invention, very thin and high-strength films could be easily formed but their oil-repelling properties were somewhat inferior to those of the films obtained in Experiments 1–6.

Experiment 7

An experiment was conducted under the conditions described above, except that the stainless steel plate 25 was degreased but did not receive an further surface treatment. The magnetic fluid 10 dropped onto the center of the surface of the stainless steel plate 25 had flowed down to the lower edge of the plate after the passage of 5 minutes as shown in FIG. 7. The oil-repelling property of the stainless steel plate 25 was therefore found to be "poor".

Experiment 8

An experiment was conducted under the conditions already described above, with "Futergent 150" (a trade name of Neos Co. for a carboxylate surfactant) being used as a perfluoroalkyl anionic surfactant, a fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 9

An experiment was conducted under the conditions described above, with "Futergent 100" (a trade name of Neos Co. for a sulfonate surfactant) being used as a perfluoroalkyl anionic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 10

An experiment was conducted under the conditions described above, with "Surflon S-112" (a trade name of Asahi Glass Co., Ltd. for a phosphate ester surfactant) being used as a perfluoroalkyl anionic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 11

An experiment was conducted under the conditions described above, with "Futergent 250" ( a trade name of Neos Co. for an ethylene oxide adduct surfactant) being used as a perfluoroalkyl nonionic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 12

An experiment was conducted under the conditions described above, with "Surflon S-141" (a trade name of Asahi Glass Co., Ltd. for an amine oxide surfactant) being used as a perfluoroalkyl nonionic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 13

An experiment was conducted under the conditions described above, with "Futergent 300" (a trade name of Neos Co. for a quaternary ammonium salt surfactant) being used as a perfluoroalkyl cationic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

Experiment 14

An experiment was conducted under the conditions described above, with "Surflon S-121" (a trade name of Asahi Glass Co., Ltd. for a quaternary ammonium salt surfactant) being used as a perfluoroalkyl cationic surfactant, a kind of fluorine-containing surfactant. The magnetic fluid 10 dropped onto the center of the surface of the stainless steel plate 25 had flowed halfway down said steel plate after the passage of 5 minutes as shown in FIG. 6. It was therefore verified that the stainless steel plate 25 had a "good" oil-repelling property.

It should be noted that a character of the surface to be coated depends on a kind of fluorine-containing surfactant, but does not depend on a kind of volatile solvents. When a fluorine-containing surfactant is adsorbed by utilizing any of volatile solvents of the present invention, the same effect as the above-mentioned experiments can be obtained.

Using the fluorine-containing surfactants that were found to be effective in the experiments described above, oil-repelling layers were formed on the surfaces of the pole pieces and the shaft that were to be used to construct an actual magnetic fluid seal apparatus. An example of the treatment advantageously used t form such oil-repelling layers is described below. Also described below is an experiment that was conducted to test the performance of the magnetic fluid seal apparatus having incorporated therein the pole pieces and the shaft that had oil-repelling layers formed on their surfaces by said treatment.

Prior to forming the oil-repelling layers, the stainless steel pole pieces and shaft were immersed in Freon (trichloroethane and other organic solvents are also usable) and their surfaces were degreased by application of ultrasonic vibration. After this preliminary treatment, an oil-repelling layer was formed on the surfaces of the pole pieces and the shaft by the following sequence.

(a) Step 1:

The degreased pole pieces and shaft were immersed in a solution of 0.05–5 wt/v % of "Futergent 400S" (a perfluoroalkyl amphoteric surfactant of Neos Co.) in Freon (solvent) for 5 seconds to 1 minute. Ultrasonic vibrations were applied to insure that the solution would cover every surface of the pole pieces and the shaft.

(b) Step 2:

The pole pieces and shaft removed from the solution were immediately immersed in an ultrasonically vibrated bath of pure Freon for 5 seconds to 1 minute to remove the excess surfactant deposited on the surfaces of the pole pieces and shaft, which were thereafter recovered from the bath.

(c) Step 3:

The pole pieces and shaft were dried.

In addition to Freon, trichloroethane can also be used as a solvent for dissolving the fluorine-containing surfactant or removing the excess surfactant. Various other solvents may be used depending on the type of surfactant to be applied; methyl alcohol or ethyl alcohol may be used as solvents for perfluoroalkyl type surfactants, and a perfluoroalkyl based volatile solvent may be used as a solvent for perfluoropolyether type surfactants.

The pole pieces and shaft, each having an oil-repelling layer formed over the entire surface thereof, were assembled as shown in FIG. 1 to construct a magnetic fluid seal apparatus and an experiment was conducted to measure the amount (length) of displacement by which the magnetic fluid 10 retained between the outer surface of the shaft 2 and the inner edge of each of the pole pieces 8 and 9 moved outward of each pole piece. The shaft 2 had an outside diameter of 7 mm; the housing 1 had an inside diameter of 19 mm; the size of the gap between the outer surface of the shaft 2 and the inner edge of each of the pole pieces 8 and 9 was 0.2 mm; and the amount of magnetic fluid retained in said gap was 15 $\mu$l. The experimental conditions were as follows: temperature, 60° C.; relative humidity, 90%; rotational speed of the shaft 2, 3,600 rpm; time, 200 hours (without interruption). After the lapse of 200 hours, the amount of outward displacement of the magnetic fluid 10 was measured.

The greater the oil-repelling ability of the layers formed on the surfaces of the pole pieces 8 and 9, the shorter the length of displacement of the magnetic fluid 10. Under the test conditions specified above, the result was evaluated as "excellent" if the length of displacement was no more than 0.5 mm, "good" if the displacement was 0.5–1.5 mm, and "poor" if it exceeded 1.5 mm. The actual results of the experiment were "excellent".

Figure 10A:
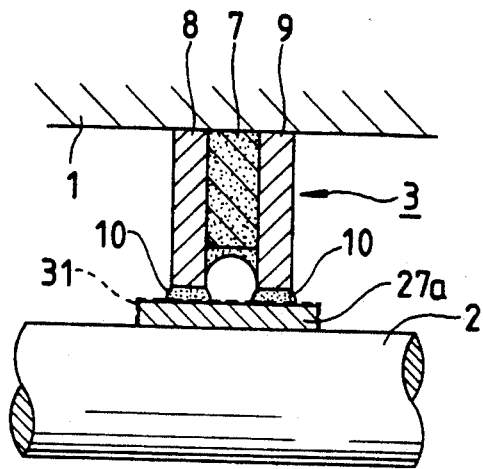
Figure 11:
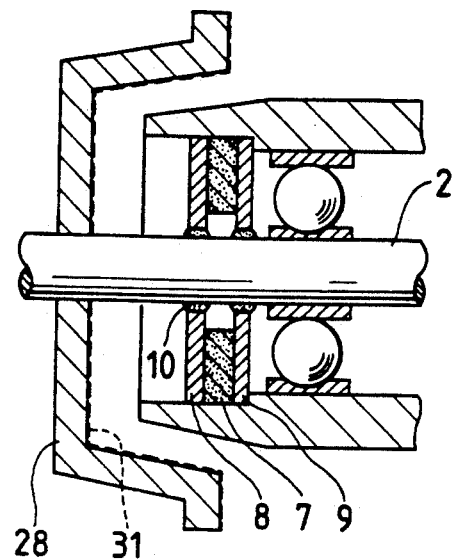
Figure 10B:
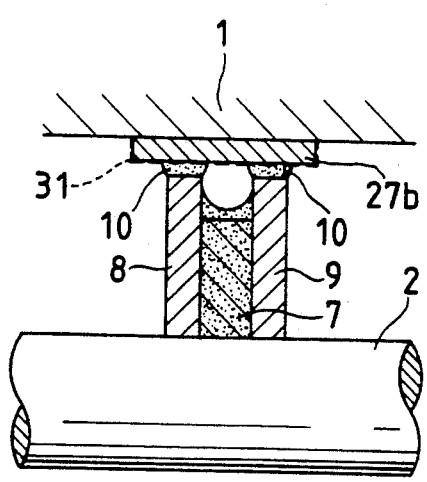
Figure 12:
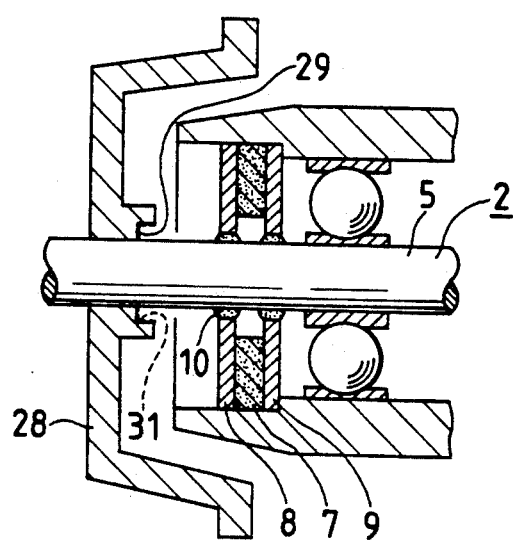
Figure 13:
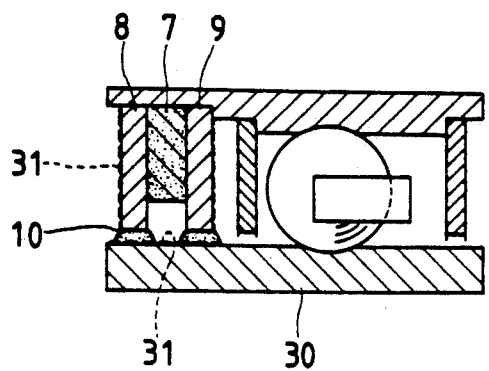
Figure 14:
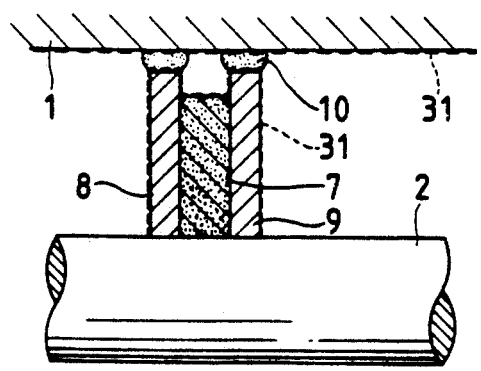
Figure 15:
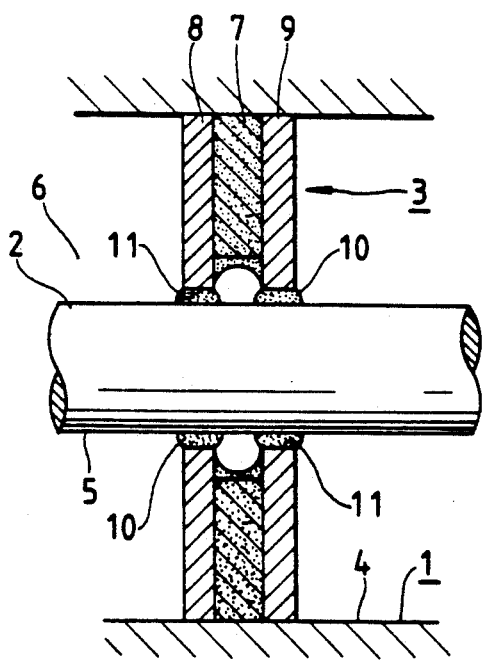
FIG. 15 is a cross-sectional view showing the basic construction of a prior art magnetic fluid seal apparatus.
Figure 16:
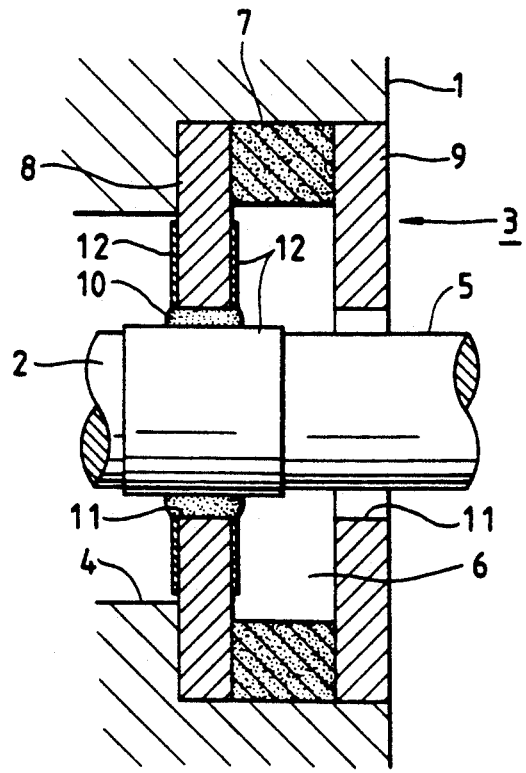
FIG. 16 is a partial sectional view showing another prior art magnetic fluid seal apparatus.

The oil-repelling layer to be provided in the magnetic fluid seal apparatus of the present invention need only be formed in the area between the inner edge of the pole piece 8 and the surface of an opposing member and which is located intermediate between the area where the magnetic fluid 10 is deposited and the area facing the clean space in which the computer hard disc is typically accommodated. In an actual magnetic fluid seal apparatus, however, oil-repelling layers may be formed at locations such as those indicated by the dashed lines in FIGS. 8–14, in which the oil-repelling layers are denoted by numeral 31. FIG. 8 shows the case where oil-repelling layers 31 are formed over the entire outer surface of the shaft 2 and on all exposed surfaces of the pole pieces 8 and 9. FIG. 9 shows the case where an oil-repelling layer 31 is formed on that part of the outer surface of the shaft 2 which extends more into the clean space than the gap 11 in which the magnetic fluid 10 is retained. FIG. 10a shows the case where an oil-repelling layer 31 is formed on the surface of a tubular member 27a that is made of a magnetic material and fitted over the middle portion of the shaft 2, secured to the area which faces the inner edges of the pair of pole pieces 8 and 9. FIG. 10b shows the case where the oil-repelling layer 31 is formed on the surface of a tubular member 27b made of a magnetic material and secured to the inner surface 4 of the housing 1, at a location which faces the outer edges of the pair of pole pieces 8 and 9. FIG. 11 shows the case where an oil-repelling layer 31 is formed on the inner lateral side of a hard disc mounting flange 28 fitted over the shaft 2 and secured proximate its end. FIG. 12 shows the case where the oil-repelling layer 31 is formed on the inner surface of a groove 29 cut in the base end of the flange 28 in such a way as to surround the outer surface 5 of the shaft 2. FIG. 13 shows the case where the magnetic fluid seal apparatus of the present invention is incorporated in a roller-bearing assembly and in which case the oil-repelling layers 31 are formed both on lateral sides of the pole pieces 8 and 9 and on the outer surface of the inner race 30 of the bearing assembly. FIG. 14 shows the case where oil-repelling layers 31 are formed on all inner surfaces of the housing 1 and over the entire surface of the pole pieces 8 and 9. The arrangements of FIGS. 8–14 can also be used in various combinations.

The magnetic fluid seal apparatus of the present invention, constructed and operated in the way described herein, has the following advantages. First, it exhibits high performance, durability and reliability and yet can be constructed at low cost. An extremely thin and yet very tenacious oil-repelling layer which prevents a magnetic fluid from splashing into a clean space in which a hard disc or other objects which may be damaged by the deposition of dust or other contamination can be formed by simple procedures and in a short period of time. The oil-repelling layer is so thin that it does not adversely affect the cleanliness of the clean space, nor does it introduce changes in the dimensions of the gap in which the magnetic fluid is to be retained.

The invention has been described in conjunction with a computer peripheral such as a hard disc drive, but is obviously more generally applicable to any sealing system using a magnetic fluid.

What is claimed is:

1. A magnetic fluid seal apparatus, comprising:
   a housing having a cylindrical inner surface,
   a shaft made of a magnetic material and having a cylindrical outer surface concentric with the inner surface of said housing and relatively rotating with respect to said housing,
   a permanent magnet formed in an annular shape of a size that permits said permanent magnet to be freely inserted into a cylindrical space between the inner surface of said housing and the outer surface of said shaft, said permanent magnet being magnetized in the axial direction of said shaft,
   at least one pole piece formed in an annular shape and having a greater inside diameter than the outside diameter of said shaft, and secured to one lateral side of said permanent magnet, said at least one pole piece being fitted in said housing and secured to its inner surface,
   a magnetic fluid retained between the inner edge of said at least one pole piece and the outer surface of said shaft by the magnetism of said permanent magnet, a first deposit surface designating the area of the outer surface of said shaft on which the magnetic fluid is deposited, a first clean surface designating an area of the outer surface of said shaft, the area extending more into a clean space, defined inwardly of said inner cylindrical surface of said housing in a direction toward said shaft, than said first deposit surface, a second deposit surface designating the surface of the inner edge of said at least one pole piece, a second clean surface designating a part of one lateral side of said at least one pole piece facing said clean space, and at least one of a first intermediate area on the outer surface of said shaft, located between said first deposit surface and said first clean surface, and a second intermediate area on the lateral side of said at least one pole piece, located between said second deposit surface and said second clean surface, having a fluorine-containing surfactant adsorbed thereon to form an oil-repelling layer to prevent magnetic fluid present at said first deposit surface and said second deposit surface, respectively, from reaching said first clean surface and said second clean surface, wherein molecules of said fluorine-containing surfactant adsorbed on said at least one of said first intermediate area and said second intermediate area are arranged such that only a portion of said molecules closest to said at least one of said first intermediate area and said second intermediate area is adsorbed on said at least one of said first intermediate area and said second intermediate area by terminal polar groups to form a monomolecule layer such that said oil-repelling layer has substantially no effect on a size of a gap in which said magnetic fluid resides, said oil-repelling layer comprising an application of a solution including said fluorine-containing surfactant on said at least one of said first and second intermediate areas, wherein a thickness of said layer is controlled by removing an excess portion of said fluorine-containing surfactant by contacting said at least one of said first and second intermediate areas with a volatile solvent, said volatile solvent being selected from the group consisting of fluorine containing solvents not containing a chlorine atom, mixtures of 1,1,1-trichloroethane and one of an alcohol, a ketone solvent, a cellosolve solvent and an aldehyde solvent, and mixtures of chlorine-containing organic solvents with alcohols that boil at temperatures not higher than 150° C.;

wherein said oil-repelling layer is produced by a method comprising the steps of:

de-greasing said at least one of said first and second intermediate areas on which said oil-repelling layer is to be formed, providing a solution containing a fluorine-containing surfactant, wetting said at least one of said first and second intermediate areas on which said oil-repelling layer is to be formed with said solution, and drying said at least one of said first and second intermediate areas on which said oil-repelling layer is to be formed, wherein said solution is provided by dissolving said fluorine-containing surfactant in a volatile solvent, said volatile solvent being selected from the group consisting of fluorine containing solvents not containing a chlorine atom, mixtures of 1,1,1-trichloroethane and one of an alcohol, a ketone solvent, a cellosolve solvent and an aldehyde solvent, and mixtures of chlorine-containing organic solvents with alcohols that boil at temperatures not higher than 150 ° C.

2. An apparatus as claimed in claim 1, wherein said shaft includes tubular member means (27a) defining said outer surface at the location of a gap formed between said shaft and said at least one pole piece.

3. A magnetic fluid seal apparatus, comprising:

at least one pole piece having a circular circumference, a housing made of a magnetic material having a cylindrical inner surface concentric with but spaced from the circumference of said at least one pole piece, a permanent magnet which is shaped and is sized to permit said permanent magnet to be freely inserted into said housing and which is magnetized in the axial direction of said housing and is secured to a lateral side of said at least one pole piece, a magnetic fluid retained between an outer edge of said at least one pole piece and the inner surface of said housing by the magnetism of said permanent magnet, a first deposit surface designating a location on the inner surface of said housing on which the magnetic fluid is deposited, a first clean surface designating a location on the inner surface of said housing, said location having an area extending more into a clean space, defined inwardly of said inner surface of said housing in a direction toward said shaft, than said first deposit surface, a second deposit surface designating the surface of the outer edge of said at least one pole piece, a second clean surface designating a part of the lateral side of said at least one pole piece which faces said clean space, and at least one of a first intermediate area on the inner surface of said housing located between said first deposit surface and said first clean surface and a second intermediate area on the lateral side of said at least one pole piece which is located between said second deposit surface and said second clean surface, having a fluorine-containing surfactant adsorbed thereon to form an oil-repelling layer to prevent magnetic fluid present at said first deposit surface and said second deposit surface, respectively, from reaching said first clean surface and said second clean surface, wherein molecules of said fluorine-containing surfactant adsorbed on said at least one of said first intermediate area and said second intermediate area are arranged such that only a portion of said molecules closest to said at least one of said first intermediate area and said second intermediate area is adsorbed on said at least one of said first intermediate area and said second intermediate area by terminal polar groups to form a monomolecule layer such that said oil-repelling layer has substantially no effect on a size of a gap in which said magnetic fluid resides, said oil-repelling layer comprising an application of a solution including said fluorine-containing surfactant on said at least one of said first and second intermediate areas, wherein a thickness of said layer is controlled by removing an excess portion of said fluorine-containing surfactant by contacting said at least one of said first and second intermediate areas with a volatile solvent, said volatile solvent being selected from the group consisting of fluorine containing solvents not containing a chlorine atom, mixtures of 1,1,1-trichloroethane and one of an alcohol, a ketone solvent, a cellosolve solvent and an aldehyde solvent, and mixtures of chlorine-containing organic solvents with alcohols that boil at temperature not higher than 150° C.;

wherein said oil-repelling layer is produced by a method comprising the steps of:

de-greasing said at least one of said first and second intermediate areas on which said oil-repelling layer is to be formed, providing a solution containing a fluorine-containing surfactant, wetting said at least one of said first and second intermediate areas on which said oil-repelling layer is to be formed with said solution, and drying said at least one of said first and second intermediate areas on which said oil-repelling layer is to be formed, wherein said solution is provided by dissolving said fluorine-containing surfactant in a volatile solvent, said volatile solvent being selected from the group consisting of fluorine containing solvents not containing a chlorine atom, mixtures of 1,1,1-trichloroethane and one of an alcohol, a ketone solvent, a cellosolve solvent and an aldehyde solvent, and mixtures of chlorine-containing solvents with alcohols that boil at temperatures not higher than 150 ° C.

4. An apparatus as claimed in claim 3, wherein said housing includes tubular member means (27b) defining said inner surface at the location of a gap between said housing and said at least one pole piece.

5. An apparatus as claimed in claim 1, wherein said fluorine-containing surfactant is selected from the group consisting of fluorine compounds with a molecular weight of 500–20,000 having a hydrophobic group containing an ether bond in the fluorocarbon chain, and fluorine compounds with a molecular weight of 100–2,000 having amphoteric groups.

6. An apparatus as claimed in claim 1, wherein said fluorine containing surfactant is one of a perfluoropolyether and perfluoroalkyl - type surfactant.

7. An apparatus according to claim 6, wherein said fluorine-containing surfactant is a perfluoropolyether monocarboxylic acid.

8. An apparatus according to claim 6, wherein said fluorine-containing surfactant is a perfluoropolyether dicarboxylic acid.

9. An apparatus according to claim 6, wherein said fluorine-containing surfactant is a perfluoroalkyl betaine.

10. An apparatus according to claim 6, wherein said fluorine-containing surfactant is a perfluoroalkyl amino acid.

11. An apparatus as claimed in claim 1, wherein said fluorine-containing surfactant is a fluorine compound with a molecular weight of 500–20,000 having a hydrophobic group containing an ester bond in the fluorocarbon chain.

12. An apparatus according to claim 1, wherein said wetting step is performed by immersing the area in said solution or spraying said solution onto the area.

13. An apparatus according to claim 1, wherein said oil repelling layer is produced by the method further comprising the steps of, after said drying step, immersing the area in a volatile solvent selected from the group consisting of alcohols, fluorine containing solvents, ketone solvents, cellosolve solvents, aldehyde solvents, ester solvents, mixtures of 1,1,1-trichloroethane and one of an alcohol, a ketone solvent, a cellosolve solvent and an aldehyde solvent, and mixtures of chlorine-containing organic solvents with alcohols that boil at temperatures not higher than 150° C., to remove excess amounts of said surfactant; and drying the area.

14. An apparatus according to claim 13, wherein said fluorine-containing surfactant is a fluorine compound with a molecular weight of 100–2,000 having amphoteric groups.

15. An apparatus according to claim 14, wherein said fluorine-containing surfactant is a perfluoroalkyl betaine.

16. An apparatus according to claim 14, wherein said fluorine-containing surfactant is a perfluoroalkyl amino acid.

17. An apparatus according to claim 13, wherein said volatile solvent is said fluorine containing solvent, and said fluorine-containing surfactant is a fluorine compound with a molecular weight of 500–20,000 having a hydrophobic group containing an ether bond in the fluorocarbon chain.

18. An apparatus according to claim 17, wherein said fluorine-containing surfactant is a perfluoropolyether monocarboxylic acid.

19. An apparatus according to claim 17, wherein said fluorine-containing surfactant is a perfluoropolyether dicarboxylic acid.

20. An apparatus according to claim 13, wherein said volatile solvent is said fluorine containing solvent, and said fluorine-containing surfactant is a fluorine compound with a molecular weight of 500–20,000 having a hydrophobic group containing an ester bond in the fluorocarbon chain.

21. An apparatus according to claim 1, wherein said volatile solvent is a mixture of a chlorine containing organic solvent with an alcohol that boils at a temperature not higher than 150° C., and said fluorine containing surfactant is dissolved in said mixture in amounts ranging from 0.01 to 20 wt %.

22. An apparatus according to claim 1, wherein said volatile solvent is a mixture of a chlorine-containing organic solvent with an alcohol that boils at a temperature not higher than 150° C., and said fluorine containing surfactant is dissolved in said mixture in amounts ranging from 0.1 to 5 wt %.

23. An apparatus according to claim 21, wherein said fluorine-containing surfactant is a fluorine compound with a molecular weight of 100–2,000 having amphoteric groups.

24. An apparatus according to claim 22, wherein said fluorine-containing surfactant is a fluorine compound with a molecular weight of 100–2,000 having amphoteric groups.

25. An apparatus according to claim 21, wherein said fluorine-containing surfactant is a perfluoroalkyl betaine.

26. An apparatus according to claim 22, wherein said fluorine-containing surfactant is a perfluoroalkyl betaine.

27. An apparatus according to claim 21, wherein said chlorine-containing organic solvent is a trichlorohydrocarbon.

28. An apparatus according to claim 22, wherein said chlorine-containing organic solvent is a trichlorohydrocarbon.

29. An apparatus according to claim 23, wherein said chlorine-containing organic solvent is a trichlorohydrocarbon.

30. An apparatus according to claim 24, wherein said chlorine-containing organic solvent is a trichlorohydrocarbon.

31. An apparatus according to claim 25, wherein said chlorine-containing organic solvent is a trichlorohydrocarbon.

32. An apparatus according to claim 26, wherein said chlorine-containing organic solvent is a trichlorohydrocarbon.

33. An apparatus as claimed in claim 3, wherein said fluorine-containing surfactant is selected from the group consisting of fluorine compounds with a molecular weight of 500-20,000 having a hydrophobic group containing an ether bond in the fluorocarbon chain, and fluorine compounds with a molecular weight of 100-2,000 having amphoteric groups.

34. An apparatus as claimed in claim 3, wherein said fluorine containing surfactant is one of a perfluoropolyether and perfluoroalkyl-type surfactant.

35. An apparatus according to claim 34, wherein said fluorine-containing surfactant is a perfluoropolyether monocarboxylic acid.

36. An apparatus according to claim 34, wherein said fluorine-containing surfactant is a perfluoropolyether dicarboxylic acid.

37. An apparatus according to claim 34, wherein said fluorine-containing surfactant is a perfluoroalkyl betaine.

38. An apparatus according to claim 34, wherein said fluorine-containing surfactant is a perfluoroalkyl amino acid.

39. An apparatus as claimed in claim 3, wherein said fluorine-containing surfactant is a fluorine compound with a molecular weight of 500-20,000 having a hydrophobic group containing an ester bond in the fluorocarbon chain.

40. An apparatus according to claim 3, wherein said wetting step is performed by immersing the area in said solution or spraying said solution onto the area.

41. An apparatus according to claim 3, wherein said method of producing said oil-repelling layer further comprises the steps of, after said drying step,
    immersing the area in a volatile solvent selected from the group consisting of alcohols, fluorine containing solvents, ketone solvents, cellosolve solvents, aldehyde solvents, ester solvents, mixtures of 1,1,1-trichloroethane and one of an alcohol, a ketone solvent, a cellosolve solvent and an aldehyde solvent, and mixtures of chlorine-containing organic solvents with alcohols that boil at temperatures not higher than 150° C., to remove excess amounts of said surfactant; and
    drying the area.

42. An apparatus according to claim 41, wherein said fluorine-containing surfactant is a fluorine compound with a molecular weight of 100-2,000 having amphoteric groups.

43. An apparatus according to claim 42, wherein said fluorine-containing surfactant is a perfluoroalkyl betaine.

44. An apparatus according to claim 42, wherein said fluorine-containing surfactant is a perfluoroalkyl amino acid.

45. An apparatus according to claim 41, wherein said volatile solvent is said fluorine containing solvent, and said fluorine-containing surfactant is a fluorine compound with a molecular weight of 500-20,000 having a hydrophobic group containing an ether bond in the fluorocarbon chain.

46. An apparatus according to claim 45, wherein said fluorine-containing surfactant is a perfluoropolyether monocarboxylic acid.

47. An apparatus according to claim 45, wherein said fluorine-containing surfactant is a perfluoropolyether dicarboxylic acid.

48. An apparatus according to claim 44, wherein said volatile solvent is said fluorine containing solvent, and said fluorine-containing surfactant is a fluorine compound with a molecular weight of 500-20,000 having a hydrophobic group containing an ester bond in the fluorocarbon chain.

49. An apparatus according to claim 3, wherein said volatile solvent is a mixture of a chlorine-containing organic solvent with an alcohol that boils at a temperature not higher than 150° C., and said fluorine containing surfactant is dissolved in said mixture in amounts ranging from 0.01 to 20 wt %.

50. An apparatus according to claim 3, wherein said volatile solvent is a mixture of a chlorine-containing organic solvent with an alcohol that boils at a temperature not higher than 150° C., and said fluorine containing surfactant is dissolved in said mixture in amounts ranging from 0.1 to 5 wt %.

51. An apparatus according to claim 49, wherein said fluorine-containing surfactant is a fluorine compound with a molecular weight of 100-2,000 having amphoteric groups.

52. An apparatus according to claim 50, wherein said fluorine-containing surfactant is a fluorine compound with a molecular weight of 100-2,000 having amphoteric groups.

53. An apparatus according to claim 49, wherein said fluorine-containing surfactant is a perfluoroalkyl betaine.

54. An apparatus according to claim 50, wherein said fluorine-containing surfactant is a perfluoroalkyl betaine.

55. An apparatus according to claim 49, wherein said chlorine-containing organic solvent is a trichlorohydrocarbon.

56. An apparatus according to claim 50, wherein said chlorine-containing organic solvent is a trichlorohydrocarbon.

57. An apparatus according to claim 51, wherein said chlorine-containing organic solvent is a trichlorohydrocarbon.

58. An apparatus according to claim 52, wherein said chlorine-containing organic solvent is a trichlorohydrocarbon.

59. An apparatus according to claim 53, wherein said chlorine-containing organic solvent is a trichlorohydrocarbon.

60. An apparatus according to claim 54, wherein said chlorine-containing organic solvent is a trichlorohydrocarbon.

* * * * *